US010542466B1

(12) United States Patent
Indurkar et al.

(10) Patent No.: US 10,542,466 B1
(45) Date of Patent: Jan. 21, 2020

(54) MOBILE PHONE AUTHENTICATION IN WIFI COVERAGE

(71) Applicant: Sprint Communications Company L.P., Overland Park, KS (US)

(72) Inventors: Dhananjay Indurkar, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/990,422

(22) Filed: May 25, 2018

(51) Int. Cl.
*H04W 36/00* (2009.01)
*H04W 12/06* (2009.01)
*H04W 36/32* (2009.01)
*H04W 12/04* (2009.01)
*H04W 84/12* (2009.01)

(52) U.S. Cl.
CPC ....... *H04W 36/0038* (2013.01); *H04W 12/06* (2013.01); *H04W 36/0022* (2013.01); *H04W 36/32* (2013.01); *H04W 12/04* (2013.01); *H04W 84/12* (2013.01)

(58) Field of Classification Search
CPC ..... H04W 36/14; H04W 88/06; H04W 36/08; H04W 84/12; H04W 36/0016; H04W 36/0022; H04W 48/18; H04W 76/15; H04W 76/19; H04W 76/22; H04W 84/045; H04W 36/18; H04W 40/36; H04W 24/04; H04W 24/10; H04W 28/0231; H04W 28/08; H04W 36/0005; H04W 36/0033; H04W 36/0055; H04W 36/32; H04W 76/16; H04W 88/08; H04W 88/12; H04W 8/02; H04W 92/045; H04W 92/20;
(Continued)

(56) References Cited

U.S. PATENT DOCUMENTS 8,572,698 B1 10/2013 Kandasamy
9,173,097 B2 10/2015 Zhu et al.
(Continued)

OTHER PUBLICATIONS

FAIPP Pre-Interview Communication dated Feb. 16, 2018, U.S. Appl. No. 15/583,998, filed May 1, 2017.
(Continued)

*Primary Examiner* — George Eng
*Assistant Examiner* — Jing Gao

(57) ABSTRACT

A method of providing a wireless communication link to a mobile communication device. The method comprises providing a first wireless communication link by a first WiFi access point (AP) to the mobile device, where the first AP broadcasts a first SSID, establishing a communication session between the mobile device and a destination communication device via the first wireless communication link, determining locations of the mobile device by a server, and, based on a change of the locations of the mobile device, sending a WiFi handoff command by the server to a second WiFi AP, where the WiFi handoff command comprises authentication credentials of the mobile device. The method further comprises providing a second wireless communication link based on the authentication credentials by a second AP to the mobile device, where the second AP broadcasts the first SSID and the communication session is continued over the second wireless communication link.

12 Claims, 7 Drawing Sheets

(58) Field of Classification Search
CPC ..... H04W 16/32; H04W 40/04; H04W 40/12; H04W 12/06; H04W 12/04
See application file for complete search history.

(56) References Cited

U.S. PATENT DOCUMENTS

| | | |
|---|---|---|
| 10,045,216 B1 | 8/2018 | Indurkar et al. |
| 2012/0240197 A1 | 9/2012 | Tran et al. |
| 2013/0007858 A1 | 1/2013 | Shah et al. |
| 2013/0023236 A1 | 1/2013 | Murray et al. |
| 2013/0074149 A1* | 3/2013 | Shaikh .................. H04L 63/108 726/3 |
| 2013/0139221 A1 | 5/2013 | Gundavelli et al. |
| 2013/0198817 A1* | 8/2013 | Haddad .................. H04L 63/18 726/5 |
| 2013/0244616 A1* | 9/2013 | Ding .................... H04W 12/06 455/411 |
| 2014/0106705 A1* | 4/2014 | Burcham .............. H04M 17/10 455/406 |
| 2014/0189808 A1 | 7/2014 | Mahaffey et al. |
| 2014/0325028 A1 | 10/2014 | Jiang |
| 2014/0355523 A1 | 12/2014 | Congdon et al. |
| 2015/0282021 A1* | 10/2015 | Pao .................. H04W 36/0066 370/331 |
| 2016/0095153 A1 | 3/2016 | Chechani et al. |
| 2017/0070923 A1* | 3/2017 | Li ..................... H04W 36/0066 |
| 2017/0156093 A1* | 6/2017 | Bhumkar .............. H04W 36/08 |
| 2017/0279630 A1* | 9/2017 | Anderson ............ G05B 19/042 |
| 2017/0332301 A1* | 11/2017 | Horn .................... H04W 36/18 |
| 2018/0220291 A1* | 8/2018 | Fares .................. H04L 63/0853 |

OTHER PUBLICATIONS

Notice of Allowance dated Apr. 12, 2018, U.S. Appl. No. 15/583,998, filed May 1, 2017.

* cited by examiner

MOBILE PHONE AUTHENTICATION IN WIFI COVERAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are typically associated with a service plan offered by a particular wireless communication service provider. When the mobile device is outside of the wireless coverage area of the network infrastructure of the wireless communication service provider, the mobile device may not be capable of conducting communication activity, although there may be wireless coverage available at that location that is provided by other wireless communication service providers. Some wireless communication service providers make roaming agreements with alternative service providers such that a wireless communication service provider can obtain a wireless link from the other wireless communication service provider. Such cellular roaming may involve the mobile communication device authenticating with the cell site of the other wireless communication service provider (i.e., the cell site of the roaming network provider) based on wireless credentials stored in a SIM card of the mobile communication device and provided to the cell site. Said in other words, the cell site may authenticate the roaming mobile communication device with the roaming network provider and not back in the home network.

SUMMARY

In an embodiment, a method of providing a wireless communication link to a mobile communication device is disclosed. The method comprises providing a first wireless communication link by a first WiFi access point to the mobile communication device, where the first WiFi access point broadcasts a first service set identifier (SSID), establishing a communication session between the mobile communication device and a destination communication device via the first wireless communication link, and determining locations of the mobile communication device by a server computer. The method further comprises, based on a change of the locations of the mobile communication device, sending a WiFi handoff command by the server computer to a second WiFi access point, where the WiFi handoff command comprises authentication credentials 124 of the mobile communication device and providing a second wireless communication link based on the authentication credentials by a second WiFi access point to the mobile communication device, where the second WiFi access point broadcasts the first SSID and the communication session is continued over the second wireless communication link, whereby the mobile communication device is provided mobile communications connectivity by a plurality of WiFi access points.

In another embodiment, a method of providing a wireless communication link to a mobile communication device is disclosed. The method comprises providing a first wireless communication link by a first WiFi access point to the mobile communication device, where the first WiFi access point broadcasts a first service set identifier (SSID), receiving mobile device credentials by the first WiFi access point via the first wireless communication link from the mobile communication device, sending the mobile device credentials by the first WiFi access point to a server in a first communication network, and determining by the server that the mobile device credentials are associated with a second communication network. The method further comprises the server executing an authentication method of an application programming interface (API) provided by the second communication network, where executing the authentication method comprises providing the mobile device credentials to the second communication network, receiving authentication confirmation by the server from the API provided by the second communication network, and creating authentication credentials for the mobile communication device by the server based on the authentication confirmation. The method further comprises sending the authentication credentials by the server to the first WiFi access point, receiving the authentication credentials by the first WiFi access point from the server, and, in response to receiving the authentication credentials, establishing a communication session between the mobile communication device and a destination communication device by the first WiFi access point via the first wireless communication link.

In yet another embodiment, a method of providing a wireless communication link to a mobile communication device is disclosed. The method comprises providing a first wireless communication link by a first WiFi access point to the mobile communication device, establishing a communication session between the mobile communication device and a destination communication device via the first wireless communication link, and determining locations of the mobile communication device by a server computer. The method further comprises, based on a change of the locations of the mobile communication device, sending a WiFi-to-cellular handoff command by the server computer to a cell site, where the WiFi-to-cellular handoff command comprises authentication credentials of the mobile communication device and providing a second wireless communication link based on the authentication credentials by the cell site to the mobile communication device, where the communication session is continued over the second wireless communication link.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
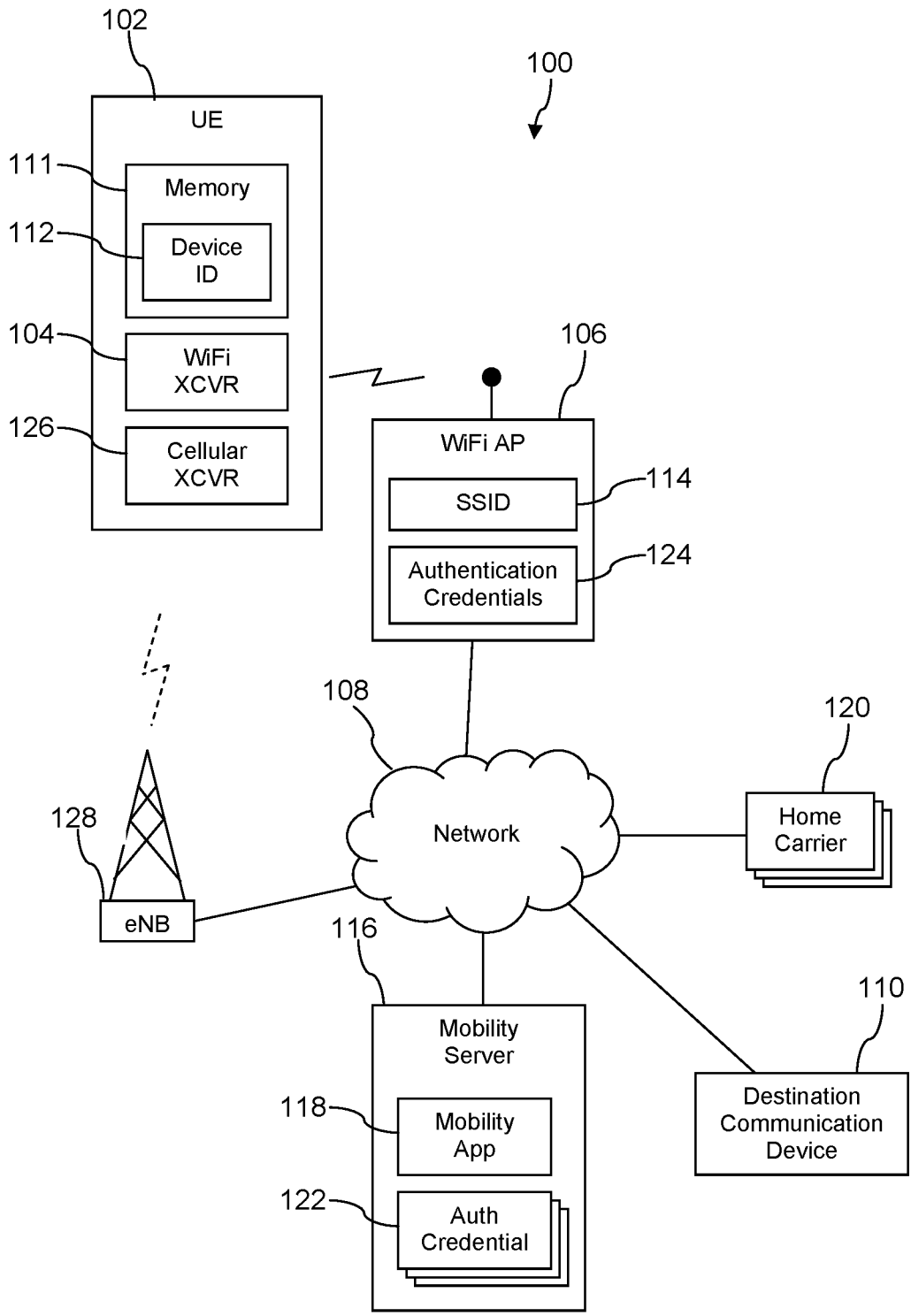
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches providing seamless communications connectivity to mobile communication devices when outside of customary wireless communication coverage. For example, a user may travel to a foreign country where the radio frequency bands of his or her mobile communication device are incompatible with the local cellular radio frequency bands. For example, a user may be inside a building, such as a large airport, where cellular coverage is unavailable. In this case, a WiFi radio transceiver of the mobile communication device may establish a wireless communication link with a first WiFi access point, where the first WiFi access point has a first service set identifier (SSID). The mobile communication device may use the wireless communication link to establish a communication session, for example a telephone voice call or a data session. As the user moves, for example walks down a corridor of an airport to reach his or her gate, the wireless communication link may be handed off from the first WiFi access point to a second WiFi access point, where the second WiFi access point also has the first SSID.

Coordination of the WiFi handoff from the first WiFi access point to the second WiFi access point may be coordinated by a server computer that tracks position and/or WiFi signal strength data associated with the mobile communication device and triggers the WiFi handoff. As part of this coordination effort, the server computer commands the second WiFi access point to communicate on the first SSID and further conveys communication session state information associated with the mobile communication device to the second WiFi access point, whereby the second WiFi access point is able to support the on-going call with the mobile communication device without an interruption. It is understood that the second WiFi access point may continue supporting on-going calls with other mobile communication devices based on one or more different SSIDs. For the user of the mobile communication device, the WiFi handoff from the first WiFi access point to the second WiFi access point and from the second WiFi access point to a third WiFi access point and so on is transparent. Said in other words, the user does not need to establish a new WiFi connection and the communication session does not terminate but continues uninterrupted and seamless. This provides improved functionality for users, who do not need to repeatedly establish communications with different WiFi access points as they move through an airport or other area. Or, alternatively, this avoids the users losing communication service and having to repeatedly re-establish a communication session. This system, further, can reduce the processing burden on WiFi access points in that they need not perform a full-up WiFi connection process (e.g., conduct authorization steps and/or authentication steps) when handoffs occur—rather the session state information is passed to it without having to be regenerated.

The WiFi access points that participate in the WiFi communication hand-off session described above may each be associated with a SSID that it broadcasts for initiating a communication link with an unconnected mobile communication device (e.g., a mobile communication device that is not connected in an on-going WiFi communication session). WiFi access points that participate in such a WiFi hand-off network may be assigned different SSIDs for broadcast purposes.

When the first WiFi access point initially interacts with the mobile communication device, the mobile communication device provides identifying information to the first WiFi access point. This identifying information may comprise a unique hardware identifier such as a mobile equipment identity (MEID) or an electronic serial number (ESN) or some other hardware identifier. This identifying information may comprise other information such as a phone number of the device. This identifying information may comprise an identity of a home carrier network or home wireless communication service provider with whom the mobile communication device has a wireless communication service subscription. The first WiFi access point provides the identifying information to the server computer.

The server computer determines a home wireless communication service provider with whom the mobile communication device has a service subscription. To authenticate the wireless communication device for wireless communication service, the server computer invokes a method of an application programming interface (API) of a computer system operated by the home service provider, including the identifying information in the method call. If the method call authenticates the wireless communication device, the method returns authentication credentials for the device comprising authentication information, authentication keys, and/or an authentication token to the server computer. If the device is authenticated successfully, the server sends the authentication credentials to the first WiFi access point, and the first WiFi access point provides a communication connection to the mobile communication device. If the method call fails, the server informs the first WiFi access point, and the first WiFi access point refuses the communication connection to the mobile communication device. When the server determines to handoff wireless coverage from the first WiFi access point to the second WiFi access point, the server sends a WiFi handoff command to the second WiFi access point with the authentication credentials and sends a WiFi drop command to the first WiFi access point. It is noted that the server can handoff the communication connection from a WiFi access point to a customary cell site or to a picocell site in the same seamless manner, passing the authentication credentials in the handoff command.

This method of providing wireless communication links and wireless communication service to mobile communication devices can be provided as an alternative to traditional roaming. This method of providing wireless communication links and wireless communication service to mobile communication devices can be provided to mobile communication devices from foreign countries whose radio frequency bands are not compatible with cellular radio bands in the United States, though in this case the mobile communication device may not be handed off from a WiFi access point to a cell site.

Turning now to FIG. 1, a communication system 100 is described. In an embodiment, system 100 comprises a mobile communication device 102 (user equipment—UE) having a WiFi radio transceiver 104, a WiFi access point (AP) 106, a network 108, and a destination communication device 110. The system 100 further comprises a mobility server 116 executing a mobility application 118, and one or more home carrier computer systems. The mobile communication device 102 may be a mobile phone, a smart phone, a personal digital assistant (PDA), a headset computer, a wearable computer, a laptop computer, a notebook computer, a tablet computer, or other mobile communication device. In some embodiments, the mobile communication device 102 comprises a cellular radio transceiver 126 which may establish a wireless communication link with a cell site 128 according to a long term evolution (LTE), a code division multiple access (CDMA), a global system for mobile communication (GSM), or a worldwide interoperability for microwave access (WiMAX) wireless communication protocol. In some embodiments, the mobile communication device 102 may comprise a cellular radio transceiver 126, but it may be unable to establish a communication link with the cell site 128 because the frequency bands supported by the cellular radio transceiver 126 may be incompatible with the frequency bands of the cell site 128, as for example when the mobile communication device 102 is configured for use in a foreign country and the cell site 128 is configured for use in the United States. The network 108 comprises one or more public networks, one or more private networks, or a combination thereof.

In an embodiment, the mobile communication device 102 further comprises a memory 111, and the memory 111 stores a device identity 112 and/or other information that is unique to the device 102 or to a subscription account associated with the device 102. In an embodiment, the device identity 112 may be stored in something other than the memory 111 such as some other electronically readable media. The WiFi radio transceiver 104 may establish a wireless link with the WiFi AP 106 and provide the device identity 112 to the WiFi AP 106. For example, the WiFi radio transceiver 104 may send a communication connection request message to the WiFi AP 106, where the connection request message embeds or otherwise carries the device identity 112. In an embodiment, the communication connection request message may identify the communication requested by the mobile communication device 102 to be something other than a customary device-WiFi communication, for example the connection request message may identify a seamless communication session type of communication.

The WiFi AP 106 may respond to the connection request message by sending a authentication request message along with the device identity 112 to the mobility application 118 executing on the mobility server 116. The mobility application 118 determines a home carrier network associated with the mobile communication device 102 (i.e., the wireless communication service provider with which the mobile communication device 102 has a service subscription) based on the device identity 112. The mobility application 118 then invokes an authentication method of an application programming interface (API) provided by the home carrier computer system 120 provided by that home carrier network, providing device identity 112 and optionally a location of the device 102 in the method call. In an embodiment, the mobile communication device 102 is a foreign device and the home computer carrier computer system 120 is a foreign communication network. In another embodiment, the device 102 is a United States-based device and the home computer carrier computer system 120 is a United States-based communication network. The home carrier computer system 120 uses the device identity 112 to determine if the mobile communication device 102 has a subscription account and whether the device 102 is authorized to use the seamless communication session type of communication. If the device is authorized, authorization credentials are returned by the home carrier computer 120 to the mobility application 118, and the mobility application 118 stores the authentication credentials 122 in a non-transitory memory of the mobility server 116.

The WiFi AP 106 may then provide a communication session or communication connection to the mobile communication device 102. The device 102 may use the communication session to communicate to the destination communication device 110, such as to another mobile communication device to complete a voice call, to a web server to download or upload data, to a computer system, or to another device. The communication session or communication channel may be a vehicle over which a plurality of data messages pass over an extended time duration. In an embodiment, the communication session or communication channel may be provided as a transport control protocol (TCP) session or connection.

As the mobile communication device 102 moves, the mobility application 118 monitors this movement and evaluates the desirability of handing off the wireless link between the device 102 and the WiFi AP 106 to a different WiFi AP or to the cell site 128. The mobility application 118 may learn of the location of the mobile communication device 102 by receiving self-location information from the device 102 via the WiFi AP 106. Alternatively, the mobility application 118 may locate the mobile communication device 102 using trilateration techniques (e.g., comparing signal strengths received by a plurality of WiFi APs themselves located at known locations and determining location of the device 102 by analyzing these signal strengths in the context of the known locations of the WiFi APs).

Figure 2:
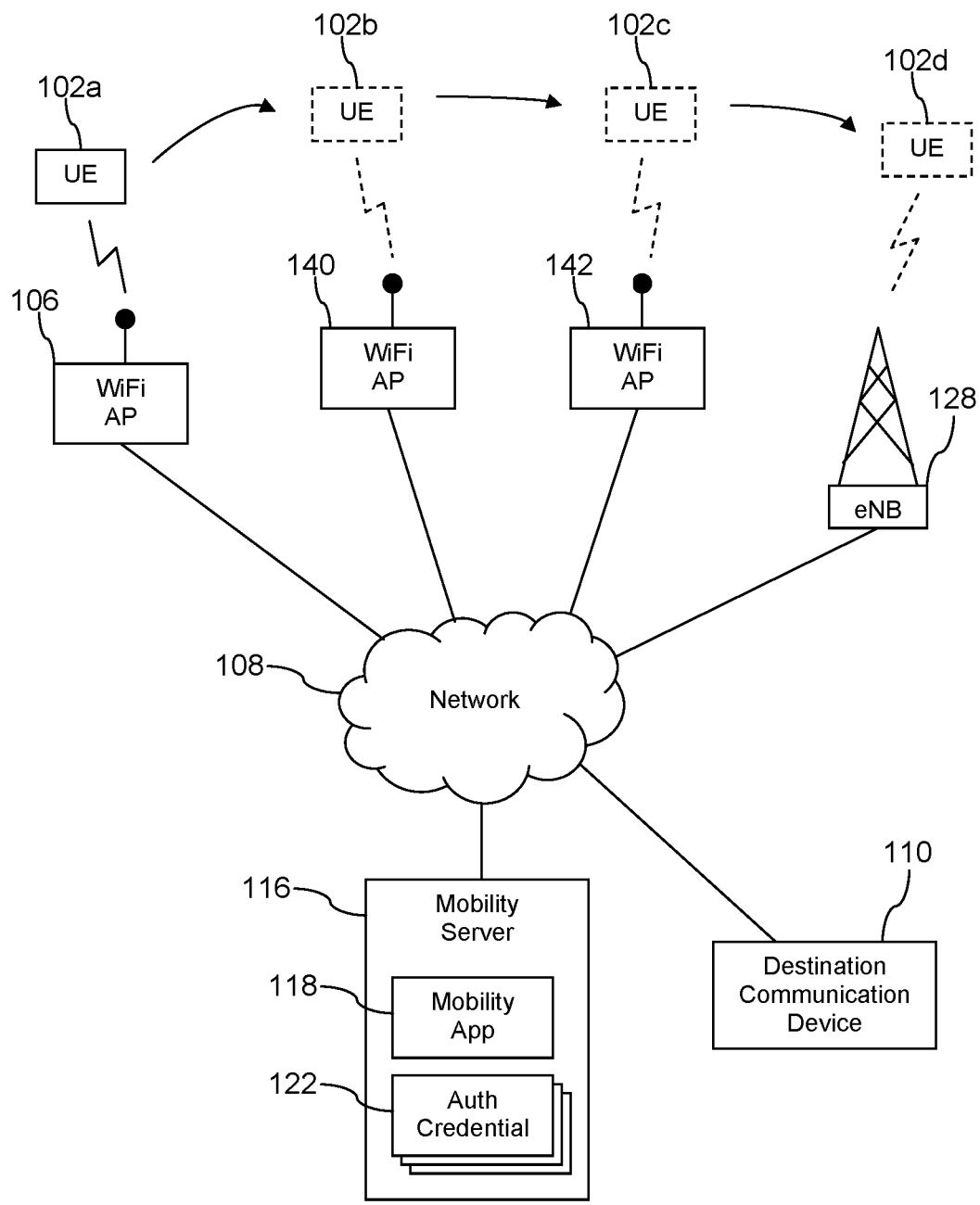
FIG. 2 is an illustration of a series of wireless communication links provided to a same mobile communication device as it moves, according to an embodiment of the disclosure.

Turning now to FIG. 2, migration of the communication session from a first WiFi AP 106 to other WiFi APs or to the cell site 128 is described. The mobile communication device 102 is shown at a first location where it is labeled 102a, a second location labeled 102b, a third location labeled 102c, and a fourth location labeled 102d. The first WiFi AP 106, the second WiFi AP 140, and the third WiFi AP 142 all employ the same SSID. In an embodiment, all WiFi APs that support the behavior described herein, for example all WiFi APs within the United States that support the described behavior, share the same single SSID. Alternatively, in an embodiment, all WiFi APs that support the behavior described herein and that are located within a contiguous area, for example within the same airport, all share the same single SSID. The use of the same SSID promotes seamless and transparent handoff of a communication session or communication connection among a plurality of different WiFi APs.

At the first location, the device 102 is provided a wireless communication link by the first WiFi AP 106. The device 102 may establish a communication session or communication connection via the first WiFi AP 106 and the network 108 to the destination communication device 110. As the mobile communication device 102 moves, for example as a user of the device 102 walks in an airport or other location, the mobility application 118 may send a handoff command message along with the authentication credential 122 for the device 102 to the second WiFi AP 140. The second WiFi AP 140 provides a wireless link to the mobile communication device 102, and the first WiFi AP 106 takes down its wireless link to the mobile communication device 102, for example in response to receiving a link release command message from the mobility application 118.

As the mobile communication device 102 continues to move from location 102b to 102c, the mobility application 118 may send a handoff command message along with the authentication credential 122 to the third WiFi AP 142. The third WiFi AP 142 provides a wireless link to the mobile communication device 102 based on receiving the authentication credential 122 in the handoff command message from the mobility application 118, and the second WiFi AP 140 takes down its wireless link to the mobile communication device 102, for example in response to receiving a link release command message from the mobility application 118.

In an embodiment (i.e., in an embodiment of the device 102 in which the cellular radio transceiver 126 is able to communicate on at least one of the frequency bands supported by the cell site 128), as the mobile communication device 102 continues to move from location 102c to location 102d, the mobility application 118 may send a handoff command message along with the authentication credential 122 to the cell site 128. The cell site 128 provides a cellular wireless link to the mobile communication device 102 based on receiving the authentication credential 122 in the handoff command message from the mobility application 118. It is noted that the device 102 does not authenticate directly with the cell site 128 and does not provide information from its SIM card to the cell site 128. The third WiFi AP 142 takes down its wireless link to the mobile communication device 102, for example in response to receiving a link release command message from the mobility application 118. In some embodiments (i.e., in an embodiment of the device 102 in which the cellular radio transceiver 126 is not able to communicate on any of the frequency bands supported by the cell site 128), the communication session or communication connection may be taken down or dropped as the mobile communication device 102 moves away from the wireless coverage of the third WiFi AP 142.

In this way, the mobile communication device 102 is provided an uninterrupted communication session or communication connection while migrating seamlessly from the first WiFi AP 106 to the second WiFi AP 140, from the second WiFi AP 140 to the third WiFi AP 142, and, optionally, from the third WiFi AP 142 to the cell site 128, without re-authenticating, and without providing SIM information.

Figure 3:
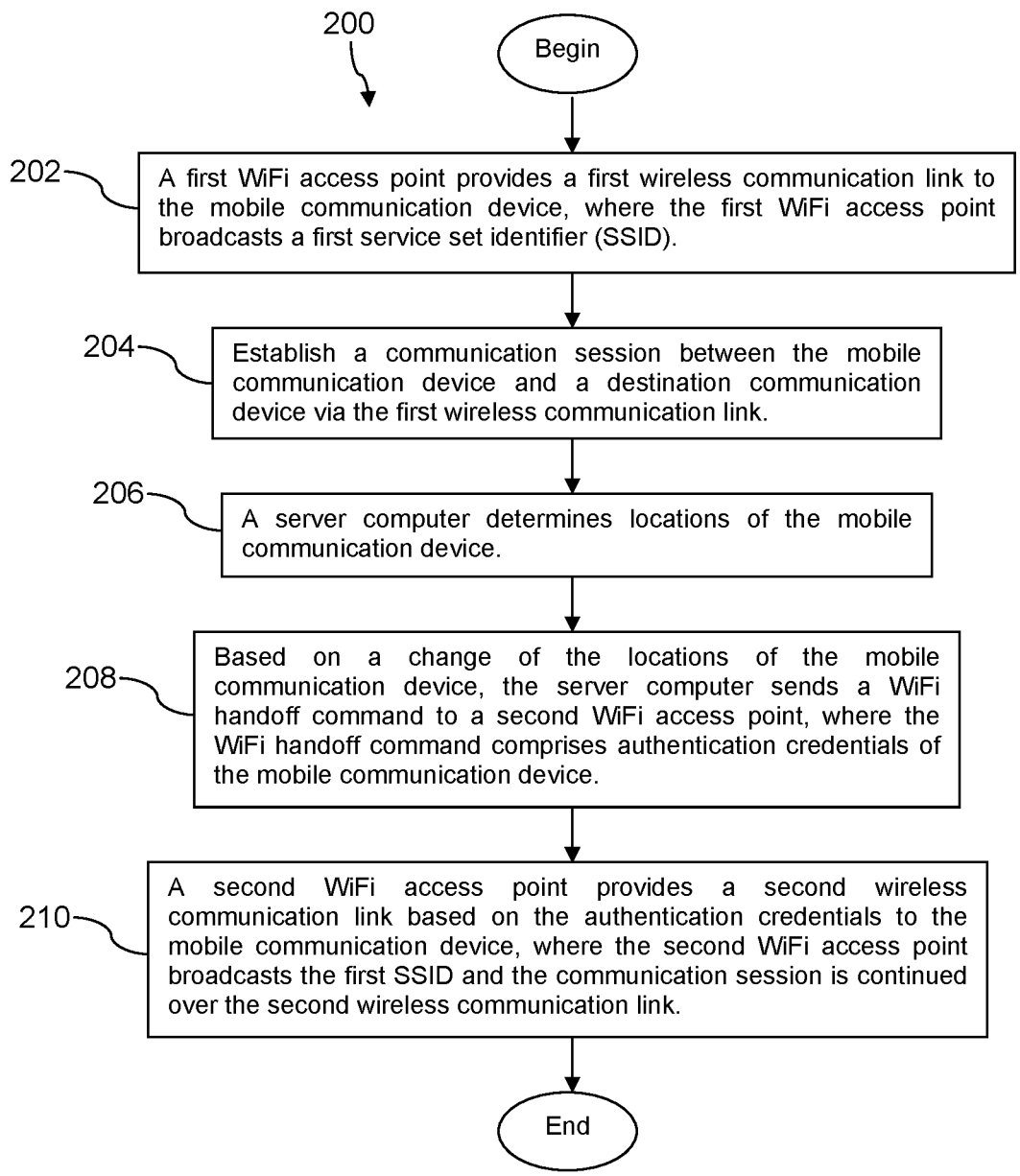
FIG. 3 is a flow chart of a method according to an embodiment of the disclosure.

Turning now to FIG. 3, a method 200 is described. At block 202, a first WiFi access point provides a first wireless communication link to the mobile communication device, where the first WiFi access point broadcasts a first service set identifier (SSID). At block 204, establish a communication session between the mobile communication device and a destination communication device via the first wireless communication link At block 206, a server computer determines locations of the mobile communication device. At block 208, based on a change of the locations of the mobile communication device, the server computer sends a WiFi handoff command to a second WiFi access point, where the WiFi handoff command comprises authentication credentials of the mobile communication device.

At block 210, a second WiFi access point provides a second wireless communication link based on the authentication credentials to the mobile communication device, where the second WiFi access point broadcasts the first SSID and the communication session is continued over the second wireless communication link.

The method 200 may further comprise, based on a change of the locations of the mobile communication device, sending a WiFi handoff command by the server computer to a third WiFi access point, where the WiFi handoff command comprises authentication credentials of the mobile communication device and providing a third wireless communication link based on the authentication credentials by a third WiFi access point to the mobile communication device, where the third WiFi access point broadcasts the first SSID and the communication session is continued over the third wireless communication link.

Figure 4A:
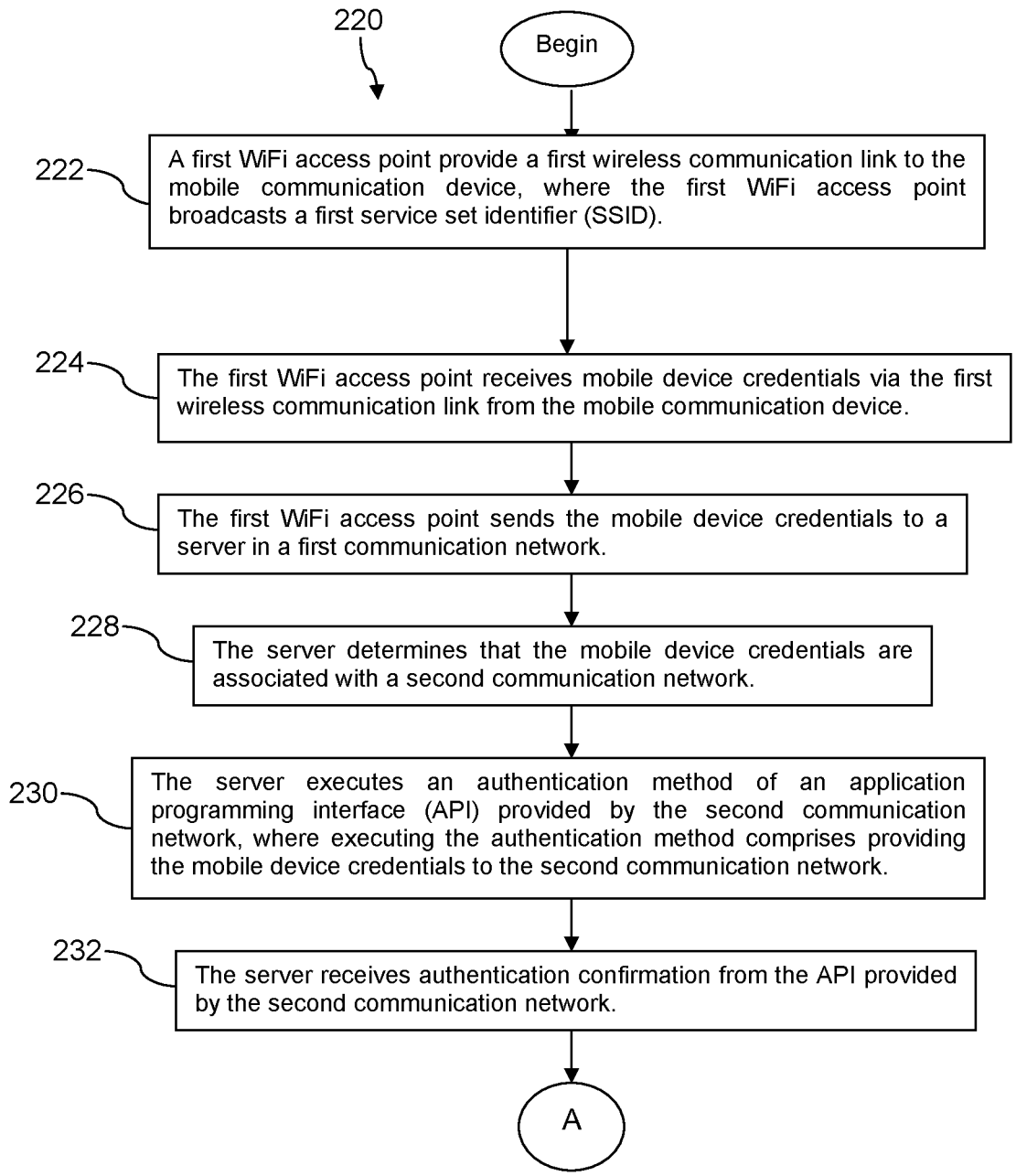
FIG. 4A and FIG. 4B is a flow chart of another method according to an embodiment of the disclosure.
Figure 4B:
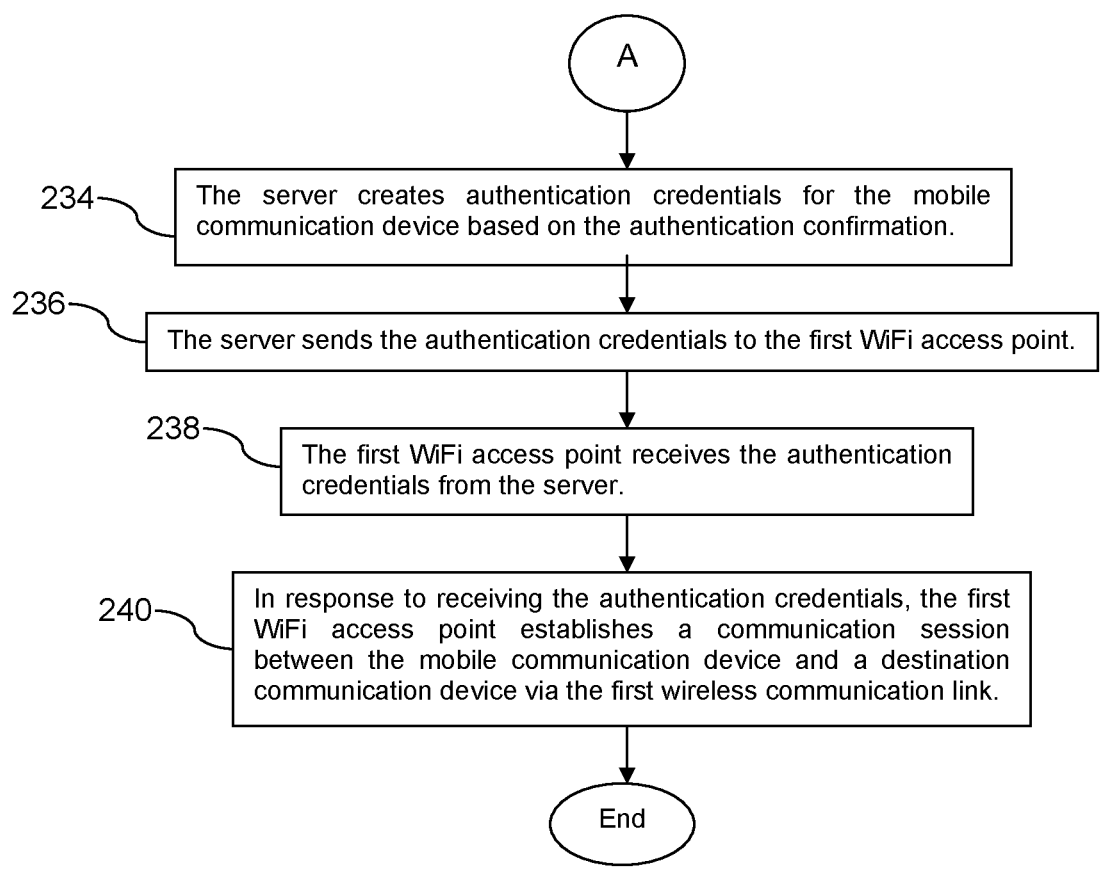

Turning now to FIG. 4A and FIG. 4B, a method 220 is described. At block 222, a first WiFi access point provide a first wireless communication link to the mobile communication device, where the first WiFi access point broadcasts a first service set identifier (SSID). At block 224, the first WiFi access point receives mobile device credentials via the first wireless communication link from the mobile communication device. At block 226, the first WiFi access point sends the mobile device credentials to a server in a first communication network.

At block 228, the server determines that the mobile device credentials are associated with a second communication network. At block 230, the server executes an authentication method of an application programming interface (API) provided by the second communication network, where executing the authentication method comprises providing the mobile device credentials to the second communication network At block 232, the server receives authentication confirmation from the API provided by the second communication network. At block 234, the server creates authentication credentials for the mobile communication device based on the authentication confirmation. At block 236, the server sends the authentication credentials to the first WiFi access point.

At block 238, the first WiFi access point receives the authentication credentials from the server. At block 240, in response to receiving the authentication credentials, the first WiFi access point establishes a communication session between the mobile communication device and a destination communication device via the first wireless communication link.

Figure 5:
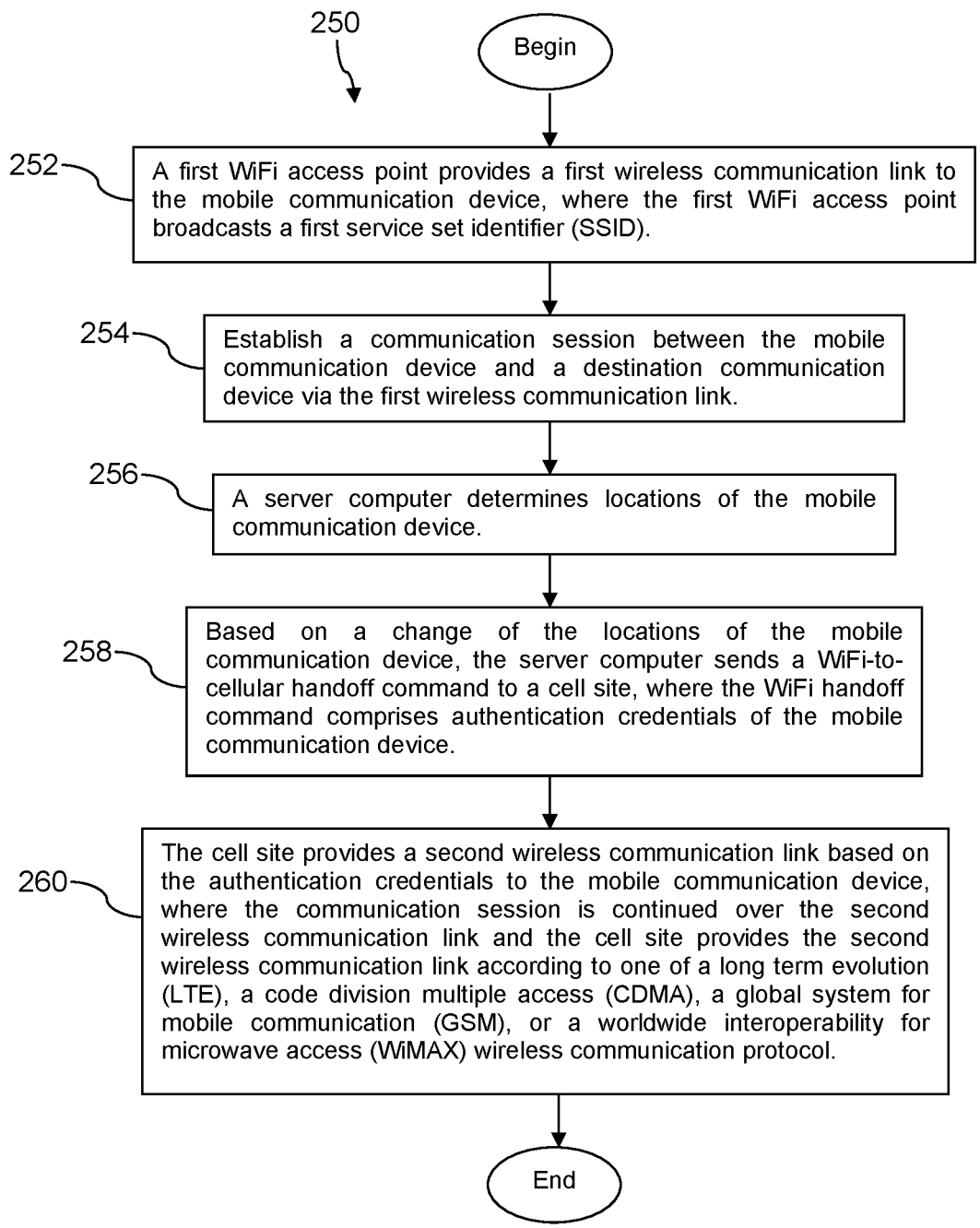
FIG. 5 is a flow chart of yet another method according to an embodiment of the disclosure.

Turning now to FIG. 5, a method 250 is described. At block 252, A first WiFi access point provides a first wireless communication link to the mobile communication device, where the first WiFi access point broadcasts a first service set identifier (SSID). At block 254, establish a communication session between the mobile communication device and a destination communication device via the first wireless communication link. At block 256, a server computer determines locations of the mobile communication device.

At block 258, based on a change of the locations of the mobile communication device, the server computer sends a WiFi-to-cellular handoff command to a cell site, where the WiFi handoff command comprises authentication credentials of the mobile communication device. At block 260, the cell site provides a second wireless communication link based on the authentication credentials to the mobile communication device, where the communication session is continued over the second wireless communication link and the cell site provides the second wireless communication link according to one of a long term evolution (LTE), a code division multiple access (CDMA), a global system for mobile communication (GSM), or a worldwide interoperability for microwave access (WiMAX) wireless communication protocol.

In an embodiment, the method 250 further comprises, based on a change of the locations of the mobile communication device, sending a WiFi handoff command by the server computer to a second WiFi access point, where the WiFi handoff command comprises authentication credentials of the mobile communication device and providing a third wireless communication link based on the authentication credentials by a second WiFi access point to the mobile communication device, where the second WiFi access point broadcasts the first SSID and the communication session is continued over the third wireless communication link. The server computer may further send a wireless link release command to the cell site.

Figure 6:
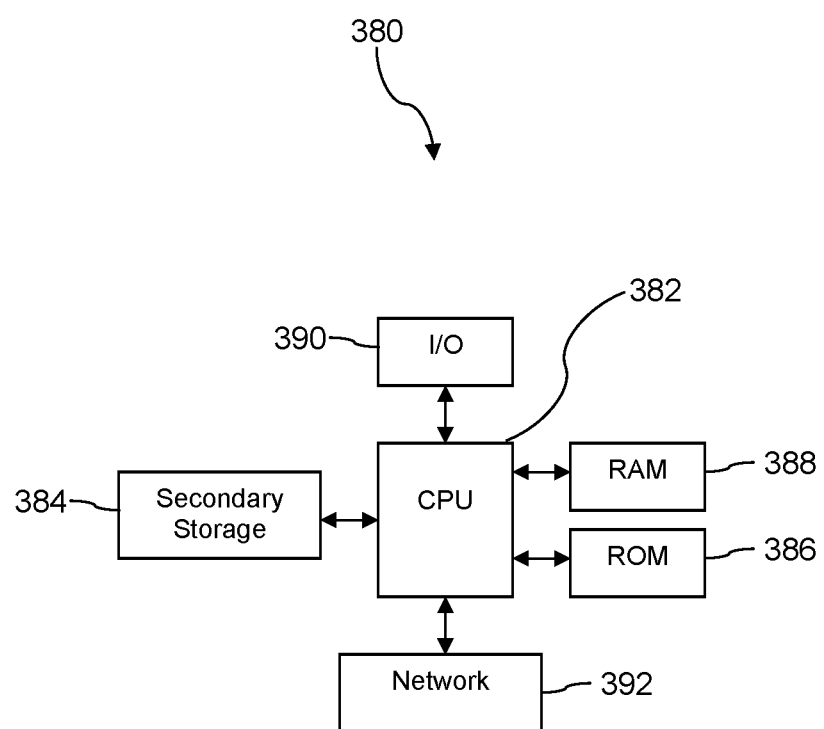
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a wireless communication link to a mobile communication device, comprising:
   providing a first wireless communication link by a first WiFi access point to the mobile communication device, where the first WiFi access point broadcasts a first service set identifier (SSID);
   establishing a communication session between the mobile communication device and a destination communication device via the first wireless communication link;
   determining locations of the mobile communication device by a server computer;

based on a change of the locations of the mobile communication device, sending a WiFi handoff command by the server computer to a second WiFi access point, where the WiFi handoff command comprises authentication credentials of the mobile communication device and an instruction to the second WiFi access point to broadcast the first SSID among a plurality of SSIDs broadcast by the second WiFi access point, and where data from a subscriber identity module (SIM) card of the mobile communication device is not included in the authentication credentials;

providing a second wireless communication link based on the authentication credentials by the second WiFi access point to the mobile communication device, where the second WiFi access point broadcasts the first SSID and the communication session is continued over the second wireless communication link according to the first SSID, and wherein the second WiFi access point broadcasts at least one SSID other than the first SSID while also broadcasting the first SSID;

based on a further change of the locations of the mobile communication device, sending a second WiFi handoff command by the server computer to a third WiFi access point, where the second WiFi handoff command comprises the authentication credentials of the mobile communication device, and wherein the communication session is handed off from the second WiFi access point to the third WiFi access point based on the second WiFi handoff command sent to the third WiFi access point; and providing a third wireless communication link based on the authentication credentials by the third WiFi access point to the mobile communication device, where the third WiFi access point broadcasts the first SSID and the communication session is continued over the third wireless communication link according to the first SSID.

2. The method of claim 1, wherein the mobile communication device is one of a mobile phone, a smart phone, a personal digital assistant (PDA), a headset computer, a wearable computer, a laptop computer, a notebook computer, or a tablet computer.

3. The method of claim 1, further comprising:
receiving a mobile device number (MDN) by the first WiFi access point from the mobile communication device; and
sending the MDN to the server computer, wherein the authentication credentials are obtained by the server computer based on the MDN.

4. The method of claim 1, further comprising:
receiving a mobile equipment identity (MEID) by the first WiFi access point from the mobile communication device; and
sending the MEID to the server computer, wherein the authentication credentials are obtained by the server computer based on the MEID.

5. The method of claim 1, further comprising sending a location of the mobile communication device, wherein the authentication credentials are obtained by the server computer based on the location.

6. The method of claim 1, wherein the mobile communication device is a foreign mobile phone.

7. A method of providing a wireless communication link to a mobile communication device, comprising:
providing a first wireless communication link by a first WiFi access point to the mobile communication device, where the first WiFi access point broadcasts a first service set identifier (SSID);

establishing a communication session between the mobile communication device and a destination communication device via the first wireless communication link;

determining locations of the mobile communication device by a server computer;

providing a second wireless communication link by a second WiFi access point based on authentication credentials received by the second WiFi access point from the server computer to the mobile communication device, where the second WiFi access point broadcasts the first SSID and the communication session is continued over the second wireless communication link according to the first SSID, and wherein the second WiFi access point broadcasts at least one SSID other than the first SSID while also broadcasting the first SSID;

based on a change of the locations of the mobile communication device, sending a WiFi handoff command by the server computer to a third WiFi access point, where the WiFi handoff command comprises authentication credentials of the mobile communication device and an instruction to the third WiFi access point to broadcast the first SSID among a plurality of SSIDs broadcast by the third WiFi access point; and providing a third wireless communication link based on the authentication credentials by the third WiFi access point to the mobile communication device, where the third WiFi access point broadcasts the first SSID and the communication session is continued over the third wireless communication link according to the first SSID;

based on a further change of the locations of the mobile communication device, sending a WiFi-to-cellular handoff command by the server computer to a cell site, where the WiFi-to-cellular handoff command comprises authentication credentials of the mobile communication device; and providing a fourth wireless communication link based on the authentication credentials by the cell site to the mobile communication device without the mobile communication device authenticating with the cell site or transmitting data from a subscriber identity module (SIM) card of the mobile communication device to the cell site, where the communication session is continued over the fourth wireless communication link.

8. The method of claim 7, further comprising sending a wireless link release command to the cell site by the server computer.

9. The method of claim 7, wherein the cell site provides the fourth wireless communication link according to one of a long term evolution (LTE), a code division multiple access (CDMA), a global system for mobile communication (GSM), or a worldwide interoperability for microwave access (WiMAX) wireless communication protocol.

10. The method of claim 7, wherein the server computer determines the authentication credentials based on a mobile device number (MDN) and a mobile equipment identity (MEID) of the mobile communication device.

11. The method of claim 7, wherein the mobile communication device is one of a mobile phone, a smart phone, a personal digital assistant (PDA), a headset computer, a wearable computer, a laptop computer, a notebook computer, or a tablet computer.

12. A method of providing a wireless communication link to a mobile communication device, comprising:

providing a first wireless communication link by a first WiFi access point to the mobile communication device, where the first WiFi access point broadcasts a first service set identifier (SSID);

establishing a communication session between the mobile communication device and a destination communication device via the first wireless communication link;

determining locations of the mobile communication device by a server computer;

based on a change of the locations of the mobile communication device, sending a WiFi handoff command by the server computer to a second WiFi access point, where the WiFi handoff command comprises authentication credentials of the mobile communication device and an instruction to the second WiFi access point to broadcast the first SSID among a plurality of SSIDs broadcast by the second WiFi access point, and where data from a subscriber identity module (SIM) card of the mobile communication device is not included in the authentication credentials; and providing a second wireless communication link based on the authentication credentials by a second WiFi access point to the mobile communication device, where the second WiFi access point broadcasts the first SSID and the communication session is continued over the second wireless communication link according to the first SSID for a duration of time of the communication session until the communication session ends or the communication session is handed-off to a WiFi access point other than the second WiFi access point and continues according to the first SSID at the WiFi access point other than the second WiFi access point, and wherein the second WiFi access point broadcasts at least one SSID other than the first SSID while also broadcasting the first SSID.

* * * * *